United States Patent [19]

Gongwer

[11] Patent Number: 5,076,258
[45] Date of Patent: Dec. 31, 1991

[54] AUTOMATIC FOOD COOKER WITH A TUBULAR FRAME CONSTITUTING HOT AND COLD FORCED AIR CONDUITS

[75] Inventor: Dean Gongwer, Wakarusa, Ind.

[73] Assignee: Nelgo Manufacturing, Inc., Wakarusa, Ind.

[21] Appl. No.: 632,099

[22] Filed: Dec. 21, 1990

[51] Int. Cl.⁵ .......................... A47J 37/00; F24B 3/00
[52] U.S. Cl. ............................... 126/25 R; 126/15 A; 126/146; 126/276
[58] Field of Search .............. 126/15 R, 15 A, 25 R, 126/25 B, 29, 30, 9 R, 50, 21 R, 21 A, 40, 77, 112, 276, 146; 99/340, 339, 447

[56] References Cited

U.S. PATENT DOCUMENTS

| | | | |
|---|---|---|---|
| 3,982,522 | 9/1976 | Hottenroth et al. | 126/25 R |
| 4,265,214 | 5/1981 | Rasmussen | 126/15 R |
| 4,616,627 | 10/1986 | Haygood | 126/25 R |

Primary Examiner—James C. Yeung
Attorney, Agent, or Firm—James D. Hall

[57] ABSTRACT

An automatic food cooker having a tubular frame used as an air conduit system for delivering air to the fuel source. When the attached fan is turned on air is blown through the tubular frame and out the exhaust on the vertical frame members. The exhaust ports are adjacent the lower longitudinal frame near the fuel source. Therefore, regardless of the wind condition the fuel source may be fed sufficient air to promote burning. Use of the tubular frame as air conduits minimizes the cost involved in providing the air delivery system for the cooker. A portion of the frame is used as hot air conduits for drawing heated air from the cooker interior and delivering it to an upper chamber for heating or cooking food products contained therein.

6 Claims, 4 Drawing Sheets

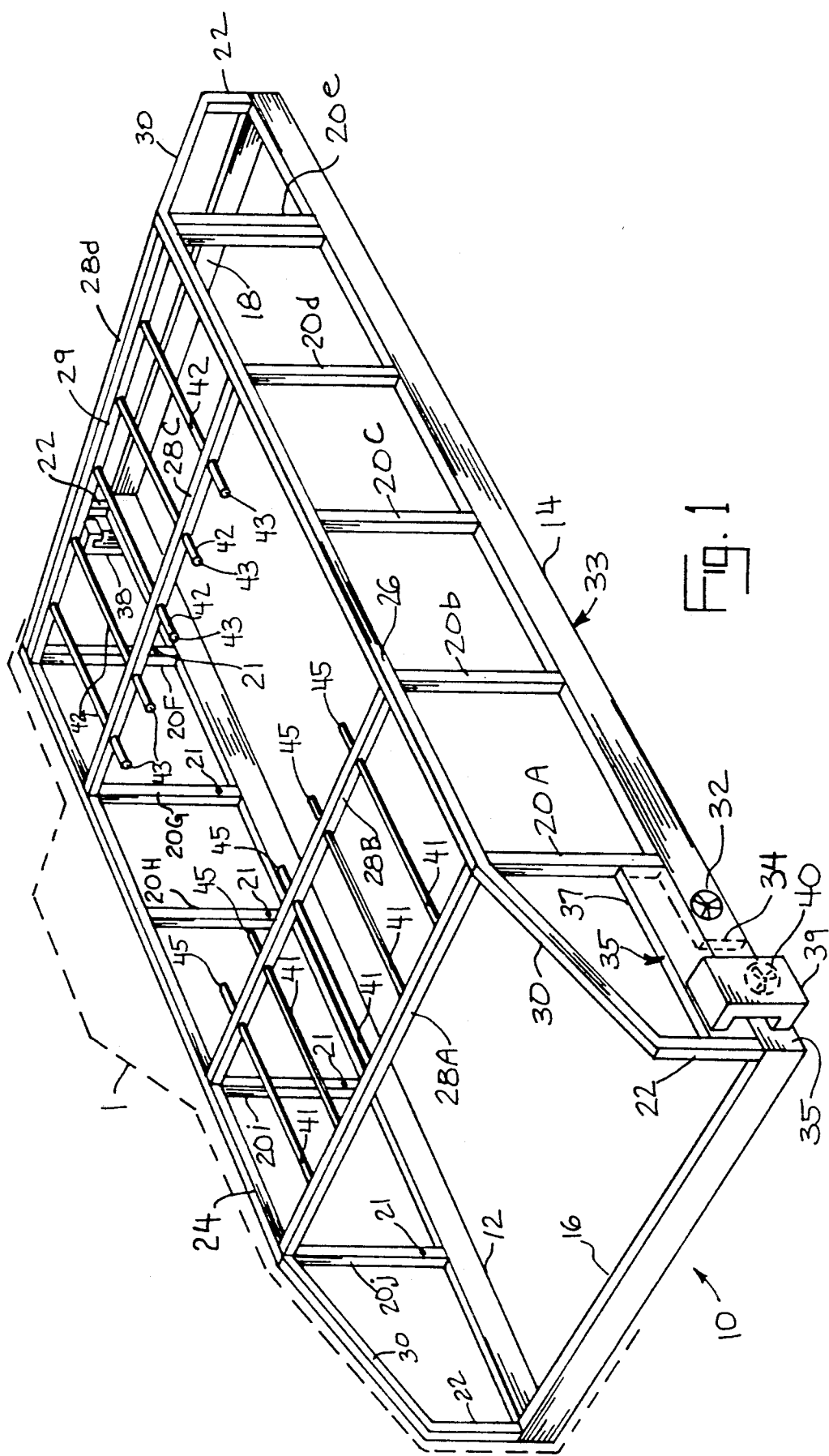

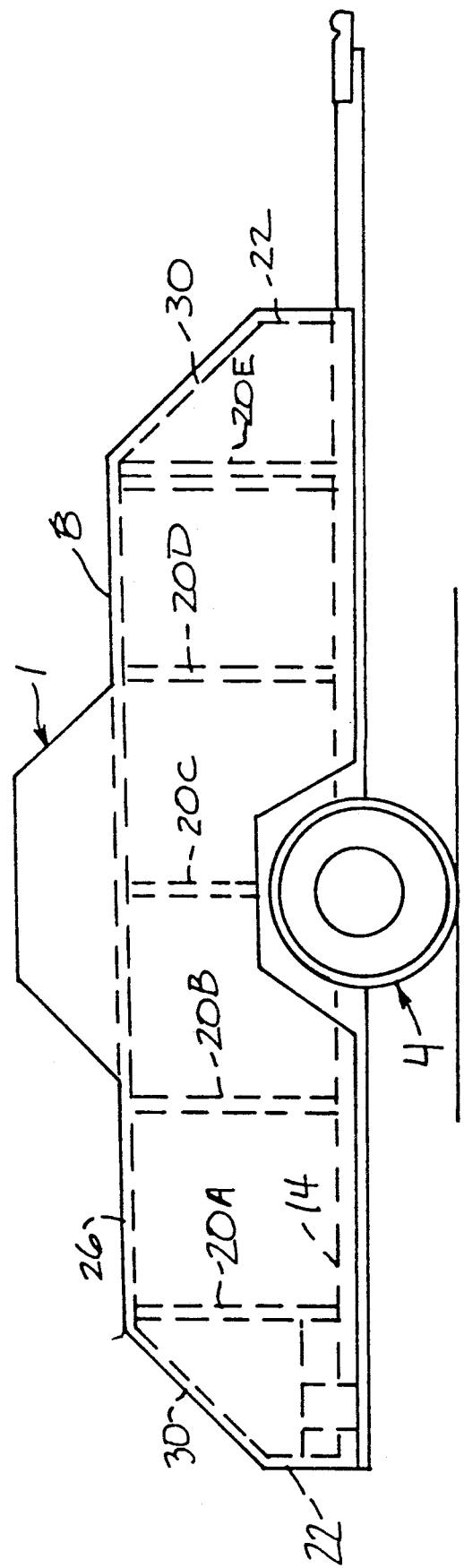

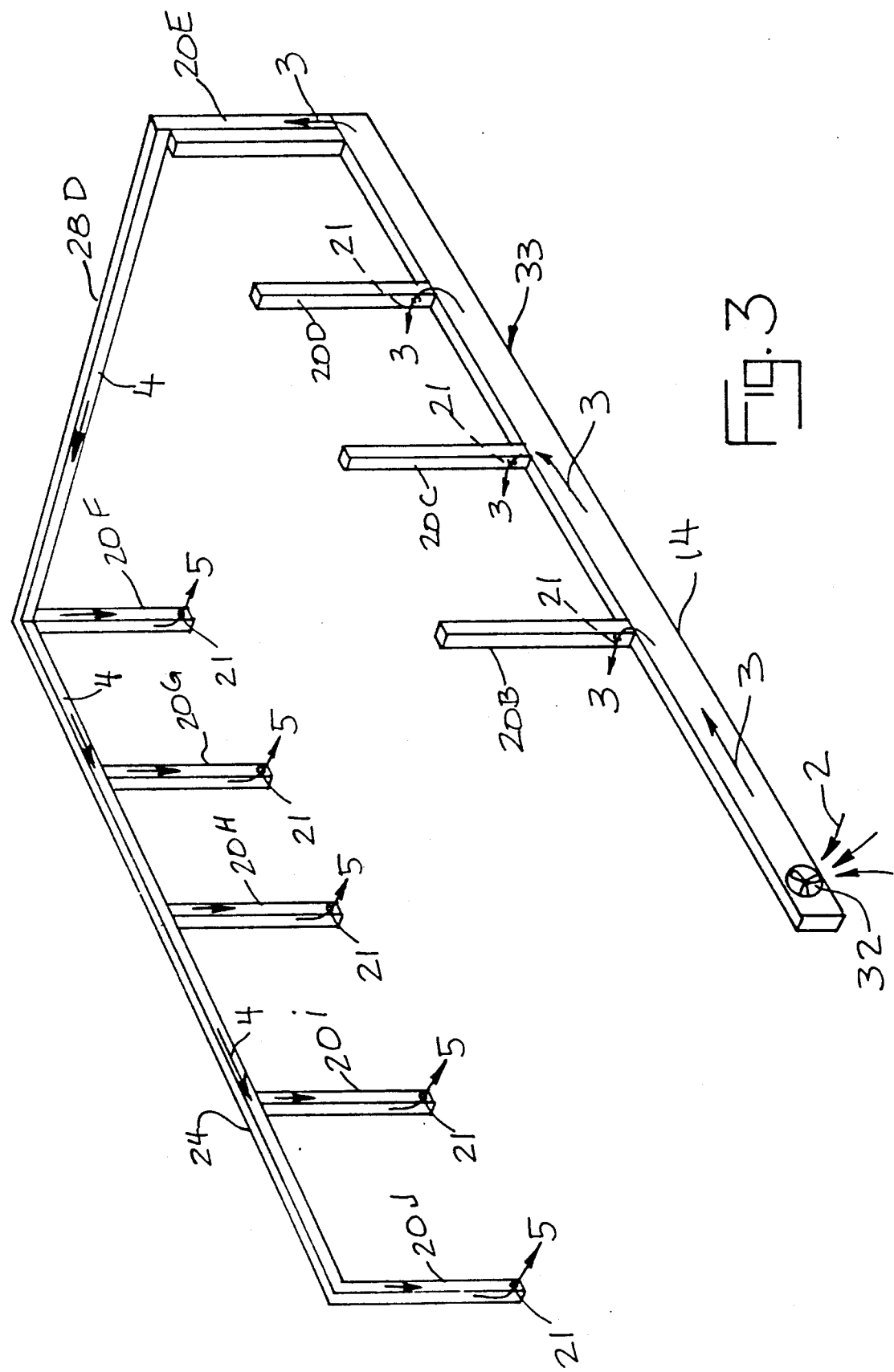

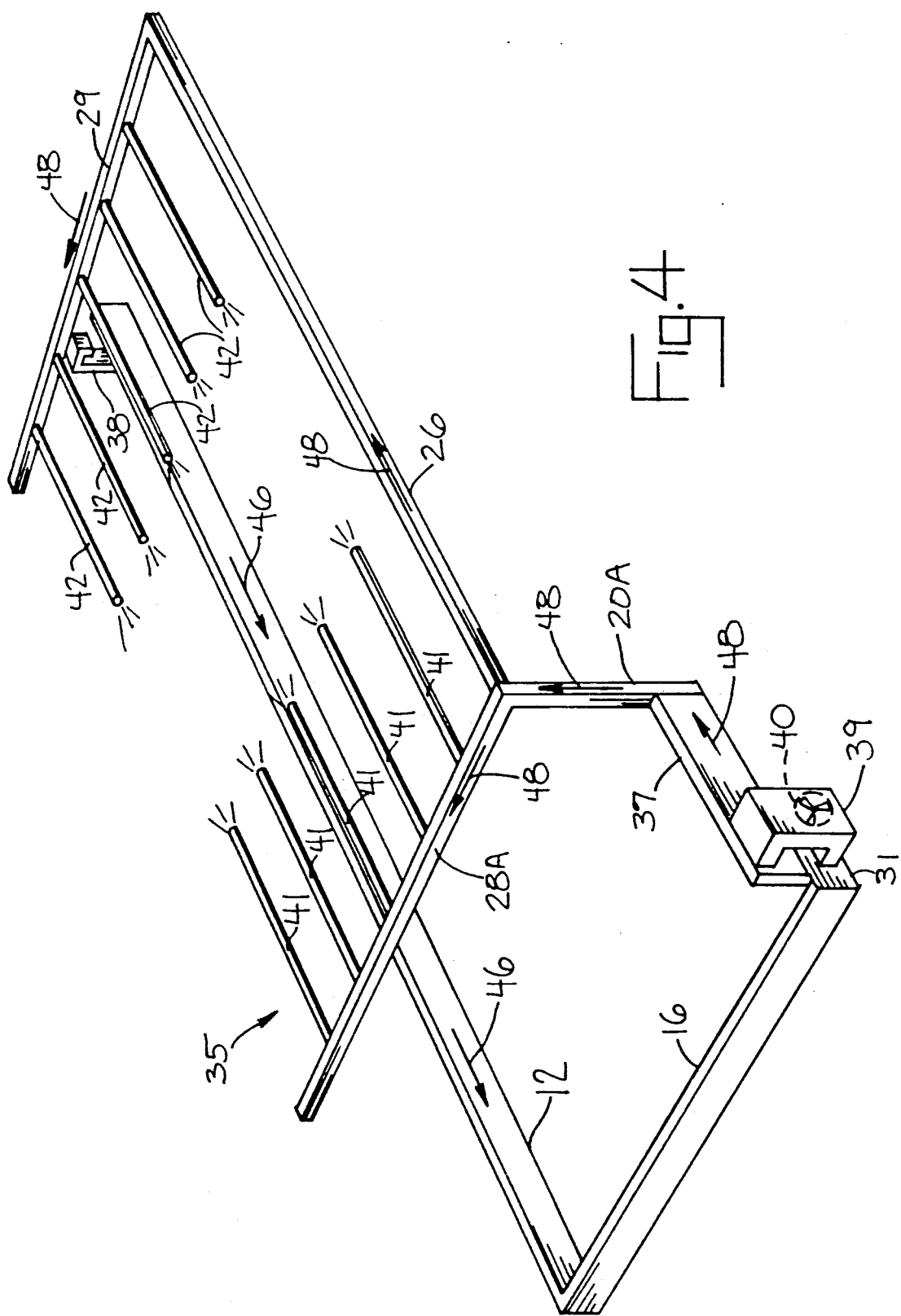

AUTOMATIC FOOD COOKER WITH A TUBULAR FRAME CONSTITUTING HOT AND COLD FORCED AIR CONDUITS

FIELD OF THE INVENTION

This invention relates to an automatic food cooker and has specific relevance to the frame of a cooker which constitutes air ducts for delivering air within the cooker.

BACKGROUND OF THE INVENTION

Automatic food cookers using solid fuels such as charcoal are known in the industry and typically include a tubular frame covered by a metal outer skin. Openings and doors are provided to provide access to the interior of the cooker. A conveyor mechanism is typically positioned within the cooker to transport food items carried by baskets through the cooker interior over the heat source. A more thorough explanation of the prior art cookers may be had by reference to U.S. Pat. Nos. 4,453,457; 4,609,596; and 4,947,741 incorporated herein by reference. When using a cooker of the type described in the incorporated patents it is often necessary to raise a few of the side wall panels of the cooker to create a draft within the cooker housing to cause the solid fuel to burn better.

A problem however exists with the prior art cookers. During days of high humidity or rain little wind blows, therefore, it is difficult to achieve a proper draft through the cooker. This causes the fuel source to burn cooler and less efficiently requiring longer cooking time for the food product.

SUMMARY OF THE INVENTION

The automatic food cooker of this invention eliminates the problem described above by blowing air through the frame and into the cooker to feed air to the fuel source. The tubular frame of the cooker is used as an air conduit system for delivering air from a fan connected to the frame to internal exhaust ports on vertical supports of the frame. When the attached fan is turned on, air is blown through the tubular frame and out the exhaust ports on the vertical supports. The exhaust ports are adjacent the lower longitudinal frame near the fuel source. Therefore, regardless of the wind condition the fuel source may be fed sufficient air to promote burning. Use of the tubular frame as air conduits minimizes the cost involved in providing the air delivery system for the cooker.

The tubular frame may be internally blocked to separate the frame into two distinct air paths. One air path is used to feed ambient air to the fuel source as described above. The second air path may be used to draw heated air from within the main cooker interior and deliver the heated air to an upper chamber of the cooker. The upper chamber is isolated from the main cooker interior and is adaptable to hold racks of cooked food for keeping the food warm or could hold racks of potatoes or similar food products for cooking by the heated air. The heated air path includes a fan to draw air from the interior of the cooker and return the heated air to the upper chamber. As the air is drawn through the frame member and delivered to the upper chamber, it is heated by the fuel source.

Accordingly, it is an object of the invention to proved for a novel automatic food cooker.

Another object of the invention is to provide for an automatic food cooker having a system for delivering forced air to the fuel source.

Another object of the invention is to provide an automatic food cooker wherein the tubular frame constitutes a means for delivering forced air to the fuel source.

Still another object of the invention is to provide for a food cooker wherein heated air drawn from the main cooker housing is delivered through the tubular frame to an upper chamber.

Further objects of the invention will become apparent upon a reading of the following description taken with the accompanying drawings.

BRIEF DESCRIPTION OF THE DRAWINGS

FIG. 1 is a perspective view of the automatic food cooker frame of this invention.

FIG. 2 is a side elevational view of a food cooker with the frame of the invention shown in broken lines for illustrative purposes.

FIG. 3 is a perspective view of the frame member of the invention used to deliver ambient air to the fuel source.

FIG. 4 is a perspective view of the frame members of the invention used to provide heated air through the cooker.

DESCRIPTION OF THE PREFERRED EMBODIMENT

The preferred embodiments herein disclosed are not intended to be exhaustive or to limit the application to the precise form disclosed. Rather, they are chosen and described to enable those skilled in the art to utilize their teachings.

Referring now to the figures, frame 10 includes lower side frame members 12 and 14 interconnected at their longitudinal ends by frame end members 16 and 18. In the preferred embodiment, frame members 12, 14, 16 and 18 are formed from metal and are generally tubular 2×4's. A plurality of vertical supports 20a-j are connected at one end to side frame members 12, 14 as illustrated. A shortened vertical support 22 is connected at each corner of frame 10 formed by the interconnected frame members 12, 14, 16 and 18. Upper side frame members 24, 26 are connected to the upper end of vertical supports 20 as illustrated. Cross pieces 28a-d are connected between opposite pairs of vertical supports 20a-j as shown. A frame member 30 is connected between the upper end of each support 22 and upper side frame members 24, 26. As thus far described, frame 10 is similar to the frames of the incorporated patents. The frame 10 is covered by a metal outer skin 8 and connected to an axle with wheels and hitch assembly 4 as shown in the incorporated patent. The cooker also includes an upper chamber 1 adapted to accommodate food products therein. FIG. 2 illustrates the cooker as including the upper chamber 1. Doors (not shown) are provided to permit access to the upper chamber.

An electric fan 32 (shown in schematic form) is connected in flow communication with lower side frame piece 14. An obstruction 34 is positioned within frame member 14 between fan 32 and end 31 of frame member 14. Each vertical support 20a-e is connected to frame member 14 over an upper opening (not shown) so as to be in flow communication with frame member 14. Each support 20a-j includes an exhaust opening or hole 21. The upper end of each support 20a-d is closed due to the connection to upper side frame member 26. The upper end of the support 20e is connected in air flow communication to the frame cross piece 28. This cross piece 28d is in turn connected in air flow communication to upper frame side member 24. Each vertical support 20f-j connected to upper side frame member 24 is in flow communication with the side frame member 24.

The frame members described in the preceding paragraph form air conduits which, with fan 32, constitute an air delivery system 33 for providing air to the solid fuel source (not shown). To provide a clearer understanding of the air delivery system thus far described FIG. 3 illustrates only those frame elements used as conduits which make up the air delivery system 33 as thus far described. In operation, air is drawn into the frame side member 14 by fan 32 (see arrows 2) and is directed along the frame member 14 in the direction of arrow 3 and out through the air ports of vertical support members 20b-e connected to the frame member 14. Support 20e is in air flow communication with rearmost cross member 28d to direct air through the cross member to upper side frame member 24 in the direction of arrows 4. Air flow is directed along frame member 24 as mentioned and down the vertical supports 20f-j connected in flow communication with member 24 and out through the air ports 21 as illustrated by arrows 5. In use when electricity is supplied to the fan 32, air is blown through the frame members as described to exit the air ports as described to feed air to the burning solid fuel (not shown) carried by the cooker between lower frame members 12, 14.

A hot air delivery system for blowing heated air into the isolated upper chamber 1 is provided and is illustrated in FIG. 1 in relation to frame 10 and is illustrated in isolated form in FIG. 4. Hot air delivery system 35 includes air inlet 38 connected at one end of frame member 12 in air flow communication with frame member 12. The opposite end of frame member 12 is connected in air flow communication with frame end member 16. A fan 40 is connected in air flow communication with a generally C-shaped tube 39 connected at one end to frame member 12. A 2×4 37 is connected between the upper end of tube 39 and the foremost support 20d connected to frame member 12. (see FIGS. 1 and 4). The 2×4 37 is welded or otherwise connected to frame member 12 and forms an air conduit between C-shaped tube 39 and the support 20d. Support 20d is connected in air flow communication to the foremost cross piece 28a and to upper side frame member 26. The upper side frame member 26 is connected in flow communication to an additional cross piece 29 which is added to frame 10 and connected so as to extend along cross piece 28d as shown. Cross piece 29 is welded or otherwise connected to the rearmost cross piece 28d. A plurality of pipes 41 are connected at one end in flow communication to the cross piece 28d and extend longitudinally through cross piece 28b as shown in FIG. 1. A like plurality of pipes 42 are connected at one end in flow communication with cross piece 29 and extend longitudinally forward through cross piece 28c in FIG. 1. The open ends 45 of pipes 41 and ends 43 of pipes 42 open into the interior of the upper chamber 1.

FIG. 4 illustrates only the frame members described in the preceding paragraph used in the hot air delivery system 35 of the invention. In use, when fan 40 is turned on, air heated by the burning fuel source is drawn into inlet 38 and pulled along frame member 12 and end piece 16 in the direction of arrows 44. The air enters C-shaped tube 39 and is blown by fan 40 out of the upper end of the C-shaped tube and into 2×4 37. The heated air is blown through 2×4 37, support 20d, cross pieces 28d, 29 and upper side frame member 26 in the direction of arrows 48. The heated air exits the system via pipes 41, 42 which exhaust the heated air into the upper chamber 1 for cooking or warming a food product contained in the chamber. In all other ways the upper chamber is physically isolated from the main cooker interior. The air heated by the burning fuel source and directed along the frame members in the direction of arrows 46, 48 and into the upper chamber is additionally heated by the fuel source as it travels along the frame elements. Therefore, the only extra energy required to deliver hot air to the chamber is that required to run fan 40. Further, as illustrated, only 2×4 37, cross piece 29 and pipes 40, 42 are added to the existing frame. Therefore, the hot air delivery system 35 illustrated in FIG. 5 is economical to add to the existing frame 10.

It should be understood that the term "air flow communication" used throughout this description indicates that air passage is permitted between the two frame pieces. Such air passage in the pre-framed embodiment is merely an opening formed in one frame part opening into the other frame part. The openings are not shown shown in the figures but are deemed to be understood in light of the above explanation.

It should also be understood that the invention is not to be limited to the precise form disclosed but may be modified within the scope of the appended claims.

I claim:

1. A frame for a food cooker, said frame including a plurality of individual interconnected supports forming a supporting structure for a body of said cooker, said individual supports peripherally located around a fuel source carried by said cooker, said supports constituting conduit means for delivering forced air to said fuel source, and fan means for blowing air into said conduit means, said individual supports having a plurality of opening means for directing a portion of said air from said conduit means toward said fuel source.

2. The food cooker of claim 1, wherein said frame includes horizontal supports, said individual supports extending vertically from said horizontal supports.

3. A food cooker having an outer shell supported by a tubular frame, said frame including a base having first and second lower side members interconnected by lower end members, a cooker top wall support having first and second upper side members interconnected by upper end members, a plurality of vertical supports being connected between said first lower side member and said first upper side member, a like plurality of vertical supports are connected between said second lower side members and said second upper side members, a plurality of cross pieces are connected between said upper side members, the improvement comprising a fan means connected to said base in air flow communication with said first lower side member for blowing air into said first lower side member, the first mentioned plurality of vertical supports being connected in air flow communication with said first lower side member, each of said first mentioned plurality of vertical supports including an opening, wherein a portion of the air blown into said first lower side member being exhausted through each said opening.

4. The food cooker of claim 3 wherein one of said cross pieces is in air flow communication between one of said first mentioned plurality of vertical supports and said second upper side member, the second mentioned plurality of vertical supports being in air flow communication with said second upper side member, each of said second mentioned plurality of vertical supports including an opening, wherein a portion of the air blown through said first lower side member by said fan means is directed through said one of said first mentioned plurality of vertical supports, said second upper side member and said second mentioned plurality of supports for exit through the second mentioned openings.

5. The food cooker of claim 3 further including a second fan means connected in air flow communication with said second lower side members, for drawing air fan within said cooker through an opening in said second lower side member, said cross pieces being in air flow communication with said second fan means and including a plurality of tubes extending from said cross pieces into an isolated chamber of said cooker, said second fan means blowing said air drawn from within said cooker into said cross pieces and said tubes for exhausting said blown air into said isolated chamber for warming a food product carried within said chamber.

6. A frame for a food cooker, said frame including a plurality of interconnected supports forming a supporting structure for a body of said cooker, said supports constituting conduit means for conducting heated air from about a fuel source carried by said cooker, upper tubes connected to said supports and extending into an isolated chamber of said cooker, fan means associated with said conduit means for drawing said heated air from about said fuel source and blowing said air through said tubes into said isolated chamber for warming a food product carried within said chamber.

* * * * *